(12) United States Patent
Dachavaram et al.

(10) Patent No.: US 12,410,336 B2
(45) Date of Patent: Sep. 9, 2025

(54) CELLULOSE BASED ANTI-VIRAL ANTI-MICROBIAL SPRAY COATING

(71) Applicants: BOARD OF TRUSTEES OF THE UNIVERSITY OF ARKANSAS, Little Rock, AR (US); Bioventures, LLC, Little Rock, AR (US); Soma Shekar Dachavaram, Little Rock, AR (US)

(72) Inventors: Soma Shekar Dachavaram, Little Rock, AR (US); John P. Moore, Fayetteville, AR (US); Peter A. Crooks, Little Rock, AR (US); Jamie Hestekin, Fayetteville, AR (US)

(73) Assignees: Board of Trustees of the University of Arkansas, Little Rock, AR (US); Bioventures, LLC, Little Rock, AR (US)

( * ) Notice: Subject to any disclaimer, the term of this patent is extended or adjusted under 35 U.S.C. 154(b) by 509 days.

(21) Appl. No.: 17/921,955

(22) PCT Filed: Apr. 27, 2021

(86) PCT No.: PCT/US2021/029491
§ 371 (c)(1),
(2) Date: Oct. 27, 2022

(87) PCT Pub. No.: WO2021/222321
PCT Pub. Date: Nov. 4, 2021

(65) Prior Publication Data
US 2023/0174814 A1 Jun. 8, 2023

Related U.S. Application Data

(60) Provisional application No. 63/016,161, filed on Apr. 27, 2020.

(51) Int. Cl.
C09D 101/04 (2006.01)
B82Y 30/00 (2011.01)
C09D 5/14 (2006.01)

(52) U.S. Cl.
CPC ............ *C09D 101/04* (2013.01); *B82Y 30/00* (2013.01); *C09D 5/14* (2013.01)

(58) Field of Classification Search
CPC ...................................... B32B 5/22
See application file for complete search history.

(56) References Cited

U.S. PATENT DOCUMENTS

2007/0104758 A1 5/2007 Hamilton et al.
2009/0035342 A1 2/2009 Karandikar et al.
(Continued)

FOREIGN PATENT DOCUMENTS

WO 2019/026071 A1 7/2019
WO 2019/023702 A1 8/2019

OTHER PUBLICATIONS

Bieser et al., "Contact-Active Antimicrobial and Potentially Self-Polishing Coatings Based on Cellulose," Macromol. Biosci., 2011, 11. pp. 111-121. (Year: 2011).*
(Continued)

*Primary Examiner* — Robert A Vetere
(74) *Attorney, Agent, or Firm* — Keith A. Vogt; Keith A. Vogt, Ltd.

(57) ABSTRACT

A cellulose based anti-viral/anti-microbial coating.

26 Claims, 11 Drawing Sheets

(56) References Cited

U.S. PATENT DOCUMENTS

| | | |
|---|---|---|
| 2009/0182337 A1 | 7/2009 | Stopek et al. |
| 2011/0177145 A1 | 7/2011 | Erkeubrecher, Jr. et al. |
| 2015/0010715 A1 | 1/2015 | Bacterin |
| 2016/0346436 A1 | 12/2016 | Boluk et al. |
| 2020/0337301 A1* | 10/2020 | Hanuka .................. A01N 59/06 |

OTHER PUBLICATIONS

El-Sayed et al., "Syntheses of New Antimicrobial Cellulose Materials Based 2-((2-aminoethyl)amino)-4-aryl-6-indolylnicotinonitriles," 2017, Egypt J. Chem. vol. 3, No. 3, pp. 465-477. (Year: 2017).*

Dachavaram, S. S.; Moore II, J. P.; Bommagani, S.; Penthala, N. R.; Calahan, J. L.; Delaney, S. P.; Munson, E. J.; Batta-Mpouma, J.; Kim, J.-W.; Hestekin, J. A.; Crooks, P. A., A Facile Microwave Assisted TEMPO/NaOCl/Oxone (KHSO5) Mediated Micron Cellulose Oxidation Procedure: Preparation of Two Nano TEMPO-Cellulose Forms. Starch-Stärke 2020, 72 (1-2), 1900213.

Tang, J.; Song, Y.; Tanvir, S.; Anderson, W. A.; Berry, R. M.; Tam, K. C., Polyrhodanine Coated Cellulose Nanocrystals: A Sustainable Antimicrobial Agent. ACS Sustainable Chemistry & Engineering 2015, 3 (8), 1801-1809.

Fu, F.; Gu, J.; Cao, J.; Shen, R.; Liu, H.; Zhang, Y.; Liu, X.; Zhou, J., Reduction of Silver Ions Using an Alkaline Cellulose Dope: Straightforward Access to Ag/ZnO Decorated Cellulose Nanocomposite Film with Enhanced Antibacterial Activities. ACS Sustainable Chemistry & Engineering 2018, 6 (1), 738-748.

Fu, F.; Li, L.; Liu, L .; Cai, J.; Zhang, Y.; Zhou, J.; Zhang, L., Construction of Cellulose Based ZnO Nanocomposite Films with Antibacterial Properties through One-Step Coagulation. ACS Applied Materials & Interfaces 2015, 7 (4), 2597-2606.

Wu, C.-N.; Fuh, S.-C.; Lin, S.-P.; Lin, Y.-Y.; Chen, H.-Y.; Liu, J.-M.; Cheng, K.-C., TEMPO-Oxidized Bacterial Cellulose Pellicle with Silver Nanoparticles for Wound Dressing. Biomacromolecules 2018, 19 (2), 544-554.

Shimizu, M.; Saito, T.; Fukuzumi, H.; Isogai, A., Hydrophobic, Ductile, and Transparent Nanocellulose Films with Quaternary Alkylammonium Carboxylates on Nanofibril Surfaces. Biomacromolecules 2014, 15 (11), 4320-4325.

Kenawy, E.-R .; Worley, S. D.; Broughton, R., The Chemistry and Applications of Antimicrobial Polymers: A State-of-the-Art Review. Biomacromolecules 2007, 8 (5), 1359-1384.

Shanmugam, Kirubanandan, et al. "Flexible spray coating process for smooth nanocellulose film production." Cellulose 25.3 (2018): 1725-1741.

Reverdy, Charlène, et al. "One-step superhydrophobic coating using hydrophobized cellulose nanofibrils." Colloids and Surfaces A: Physicochemical and Engineering Aspects 544 (2018): 152-158.

Wang, Jinwu, et al. "Moisture and oxygen barrier properties of cellulose nanomaterial-based films." ACS Sustainable Chemistry & Engineering 6.1 (2018): 49-70.

U.S. International Searching Authority; International Search Report & Written Opinion for PCT/US2021/0129491; Aug. 9, 2021; Alexandria, VA; US.

Bieser et al; Contact Active Antimicrobial and Potentially Self-Polishing Coatings Based on Cellulose; Macromolecular Bioscience; vol. 11 Issue 1; Oct. 13, 2010; pp. 111-121.

Bieser et al; Mechanistic Considerations on Contact-Active Antimicrobial Surfaces with Controlled Functional Group Densities; Macromolecular Bioscience; vol. 11 Issue 4; Apr. 8, 2011; pp. 526-534.

* cited by examiner

CELLULOSE BASED ANTI-VIRAL ANTI-MICROBIAL SPRAY COATING

RELATED APPLICATIONS

This application is a 371 U.S. National Phase of PCT/US2021/029491, filed on 27 Apr. 2021, which claims priority to U.S. Provisional Application No. 63/016,161, filed on 27 Apr. 2020, both of which are incorporated herein in their entirety.

STATEMENT REGARDING FEDERALLY SPONSORED RESEARCH & DEVELOPMENT

This invention was made with government support by an EPSCOR grant from the National Science Foundation Grant number 1457888. The government has certain rights in the invention.

BACKGROUND OF THE INVENTION

The distinct fractions of Oxone® mediated TEMPO-oxidized cellulose nanomaterials (OTO-CNMs) allow for the tuneability of gas and water vapor transport properties via chemical functionalization to make an ideal protective coating that is environmentally friendly. Literature has shown that traditional CNMs and films made thereof can be made into effective gas barriers, and a variety of modifications have been reported on CNMs.

Recent reports have shown OTO-CNMs, when produced, have two forms, including OTO-CNM Form I, and OTO-CNM Form II. Combining these two products at different concentrations can provide an avenue for OTO-CNMs to tune gas transport properties.

The main limiting factor of cellulose nanomaterial is that they are hydrophilic by nature, which makes them a poor moisture barrier. It has been seen that certain compounds can be added to create composite coatings and thereby increasing the hydrophobic properties of OTO-CNMs. One such class of compound is alkyl ketene dimers (AKD), which not only increases the hydrophobicity of the cellulose films but helps to maintain their eco-friendly properties as well.

Another limiting factor of cellulose nanomaterial is that the films produced tend to break down in the water, which makes them a poor barrier in wet environments. It has been seen that certain compounds can be added to bind cellulose materials together and thereby increasing the physical stability of OTO-CNM films in a wet environment. One such class of compound known as a cross-linking agent binds together compounds on a molecular level, such as glutaraldehyde. Another such type of compound is a non-toxic ionic liquid, 1-Ethyl-3-methylimidazolium acetate, which not only increases the stability of the cellulose films but maintains their eco-friendly properties as well.

The distinct fractions of Oxone® mediated TEMPO-oxidized cellulose nanomaterials allow for the tuneability of gas and water vapor transport properties via chemical functionalization to make an ideal protective coating that is environmentally friendly. Thin-film composite membranes have shown potential as a tunable gas barrier coating material. Free-standing, ionic liquid cross-linked, non-toxic, low fouling films have shown water stability for up to 4 weeks in a mammalian rat based model.

BRIEF SUMMARY OF THE INVENTION

In one embodiment, the present invention provides a spray-on surface that can be anti-viral and anti-bacterial to stop the spread of infectious disease.

In other embodiments, the present invention provides different techniques for achieving spray-on tunability.

In other embodiments, the present invention provides an innovative way to improve and administer OTO-CNMs, and environmentally friendly composites thereof, as a gas and moisture barrier for coating and packing various consumer goods.

In other embodiments, the present invention uses tosyl cellulose as an intermediate to create various anti-microbial surfaces directly on cellulose, namely Ciprofloxacin, Sulfamethoxazole, Trimethoprim, Isoniazid, Metronidazole, and Daptomycin.

In other embodiments, the present invention uses a binding agent to stabilize or strengthen the film.

In other embodiments, the present invention uses a cross-linking agent as the binding agent.

In other embodiments, the present invention uses an ionic liquid as the binding/cross-linking agent.

In other embodiments, the present invention, for food packaging applications, provides clear, edible moisture barriers.

In other embodiments, for food packaging applications, the present invention provides materials to decrease food spoilage, maintain freshness, be sustainable, and that is ingestible by humans.

In other embodiments, the present invention provides material having a complex nanoscale structure.

In other embodiments, the present invention provides methods to produce water-stable films.

In other embodiments, the present invention provides methods to assemble cellulose into nanorods and nanoparticles that are less than 20 nanometers in length.

In other embodiments, for hemodialysis applications, the present invention provides optically clear filters that increase flow-through and cause less fouling. Testing of the present invention shows that the cellulose material allows more blood to flow through a specific area in less time and with less fouling of blood on the membrane.

In other embodiments, for ion separation applications, the present invention provides transparent membranes that increase ion transport in electrodialysis, electro deionization, and reverse electro deionization with particular emphasis potassium selectivity.

In other embodiments, the present invention provides an edible moisture barrier via dip coating and spray coating methods. The material is biocompatible, biodegradable, and can be produced sustainably.

In other embodiments, the present invention provides anti-microbial and anti-bacterial small molecules attached to the cellulose surface spray coatings.

In other embodiments, the present invention provides coatings having the ability to stop the spread of a virus by killing various viruses and bacteria, which includes *Escherichia coli, Staphylococcus aureus*, and COVID-19.

In other embodiments, the present invention provides cellulose-bound anti-microbial agents for use in the biomedical field for wound dressing in debridement protocols after traumatic bone and tissue injury, as well as to seal and sterilize an area from the environment for prolonged periods in high contact locations in public places.

In other embodiments, the present invention provides surface food packaging materials for food preservation and for maintaining contamination integrity both at the point of the farm as well as upon arrival at the point of sale. Materials can include a dye or non-toxic color agent to indicate the efficacy of the material.

In other embodiments, the present invention provides a spray-on surface that can be anti-viral and anti-bacterial that may be used to stop the spread of infectious disease. This cellulose-based coating may be used to improve and administer OTO-CNMs and environmentally friendly composites thereof, as a gas and moisture barrier for packaging various consumer goods. The spray can be produced as a liquid to be aerosolized, or it can come prepacked as a pressurized aerosol can. The goal is to provide a quick-drying surface coating material that can easily be handled and applied by both large companies and consumers.

In other embodiments, the present invention uses a combination of cellulose and an edible wax to tune hydrophilicity.

In other embodiments, the present invention uses and does not use a combination of cellulose and surfactant.

In other embodiments, the present invention uses a surfactant (Tween-19) in dilute concentrations (<0.1%) to facilitate the spreading and even consistency of the cellulose coating.

In other embodiments, the present invention provides a spray-on packaging that attaches to surfaces. Using oxone modification and click chemistry, a cellulose surface may be formed that is anti-viral and can be modified to spray on surfaces. Because of these properties, it is an ideal coating for keeping surfaces virus/bacteria-free.

It is to be understood that both the preceding general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Figure 1:
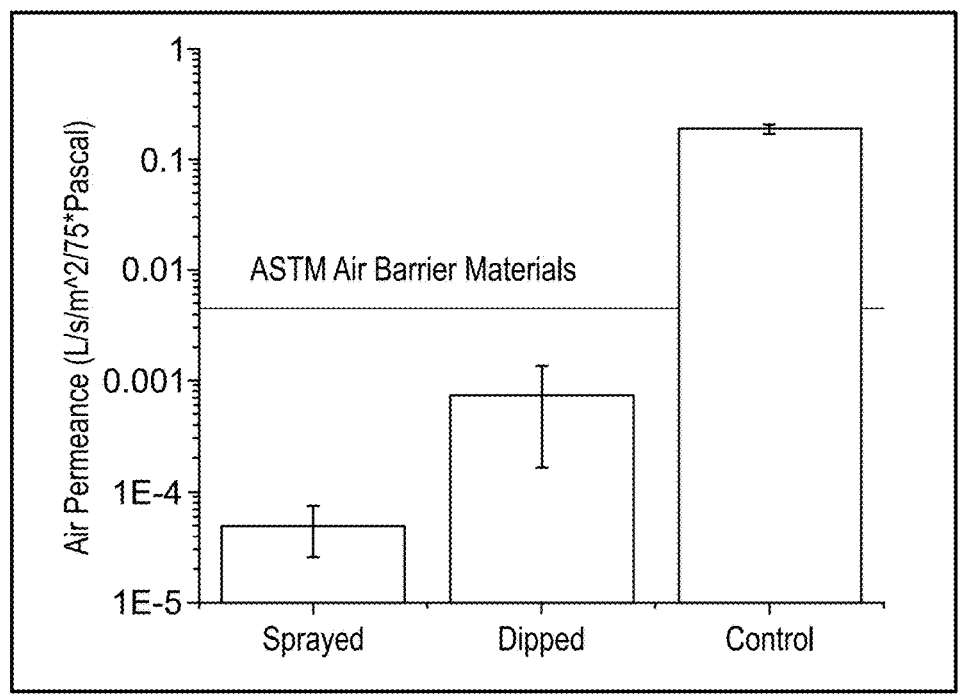
FIG. 1 illustrates nitrogen permeance of uncoated, dip coated, and spray coated 4% Form I gas barrier coatings on PVDF supports produced tested under ASTM E 2178 standards for air gas permeability.
Figure 2:
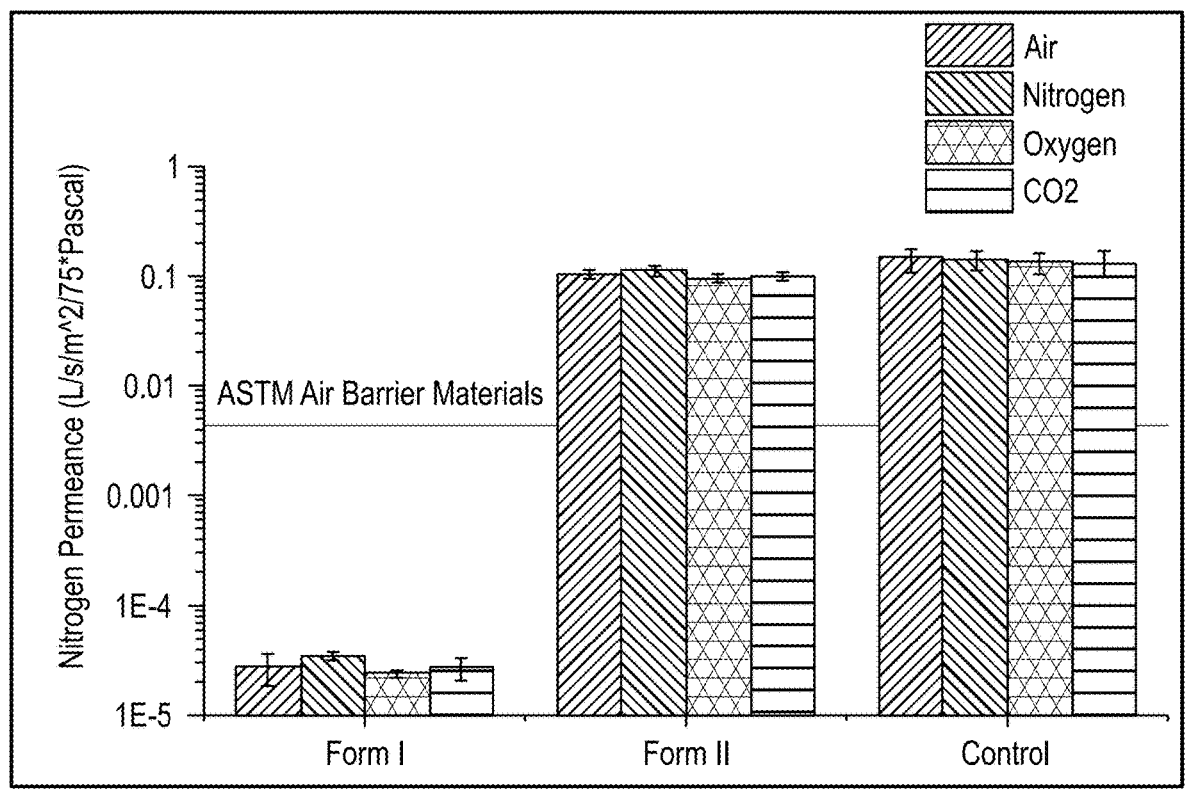
FIG. 2 illustrates air, nitrogen, carbon dioxide, and oxygen permeance, (L/s/m2) at 75 pascals, of dip and spray coated 4% CNM gas barrier coatings on PVDF supports tested under ASTM E 2178 standards for gas permeability.
Figure 3:
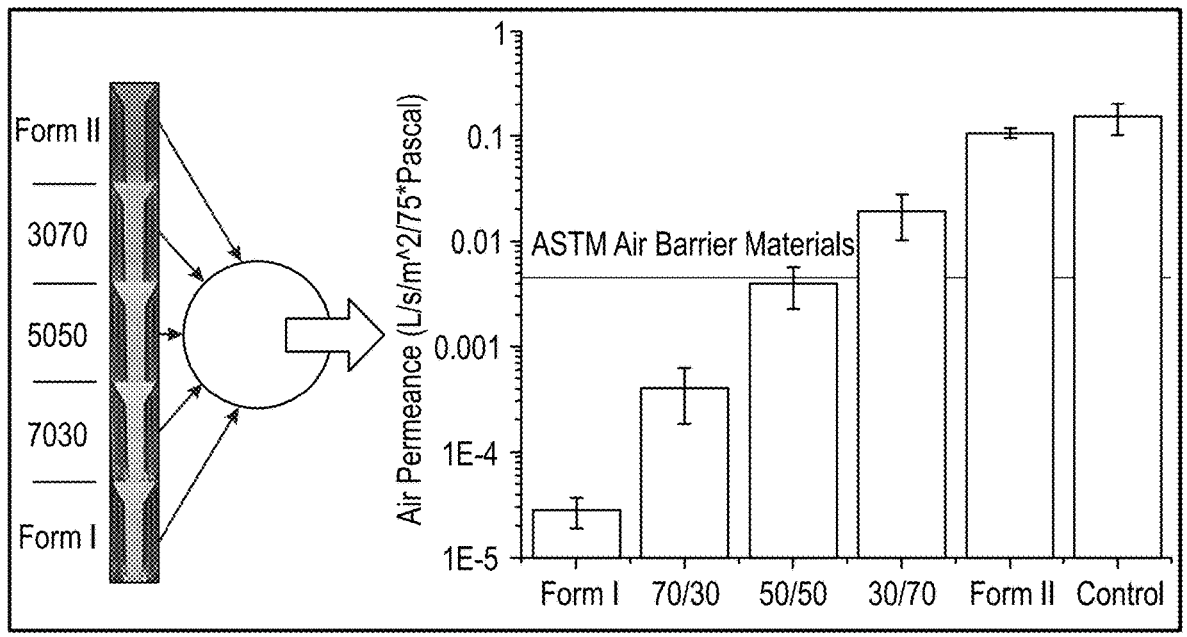
FIG. 3 illustrates air permeance of spray coated 4% OTO-CNM as represented by mass percent of Form II within the solution used for the gas barrier coatings produced tested under ASTM E 2178 standards for gas permeability.
Figure 4:
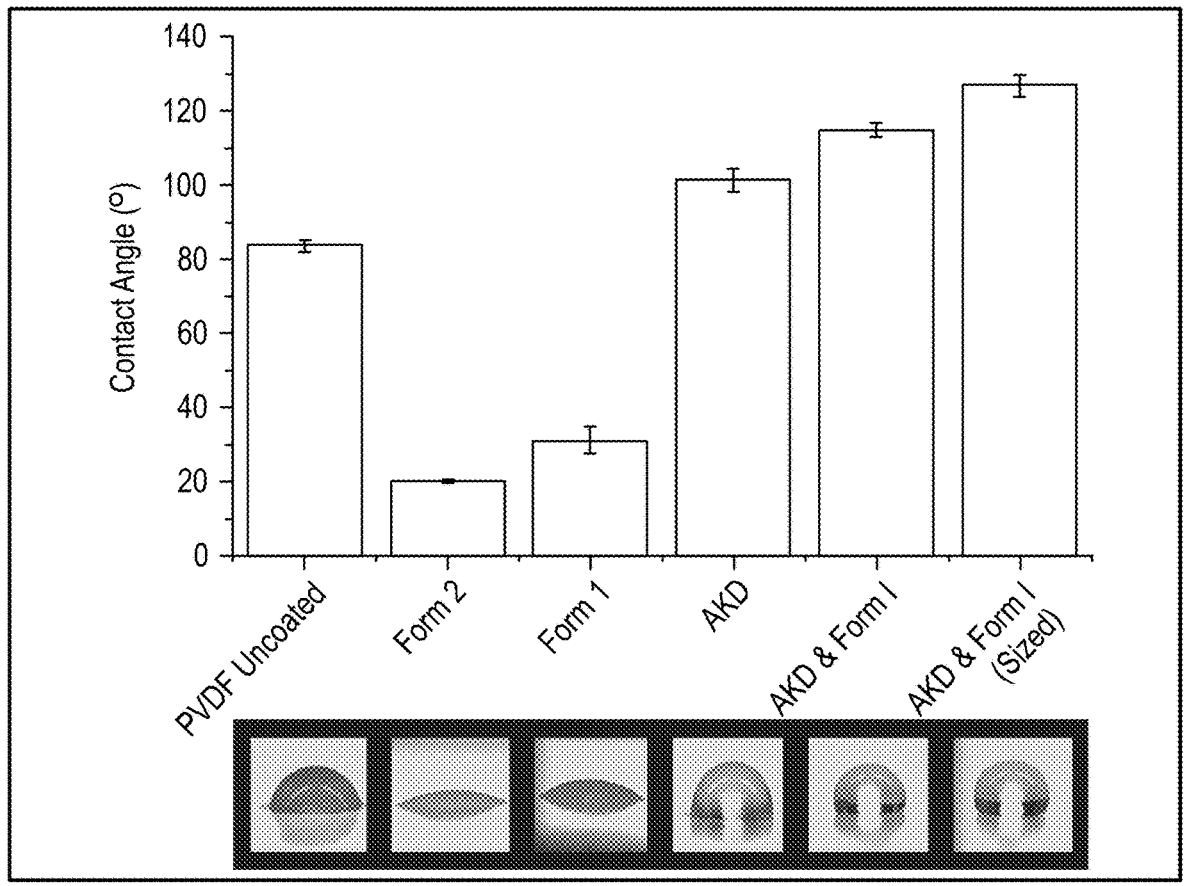
FIG. 4 illustrates contact Angle Graph and Images for embodiments of the present invention.
Figure 5:
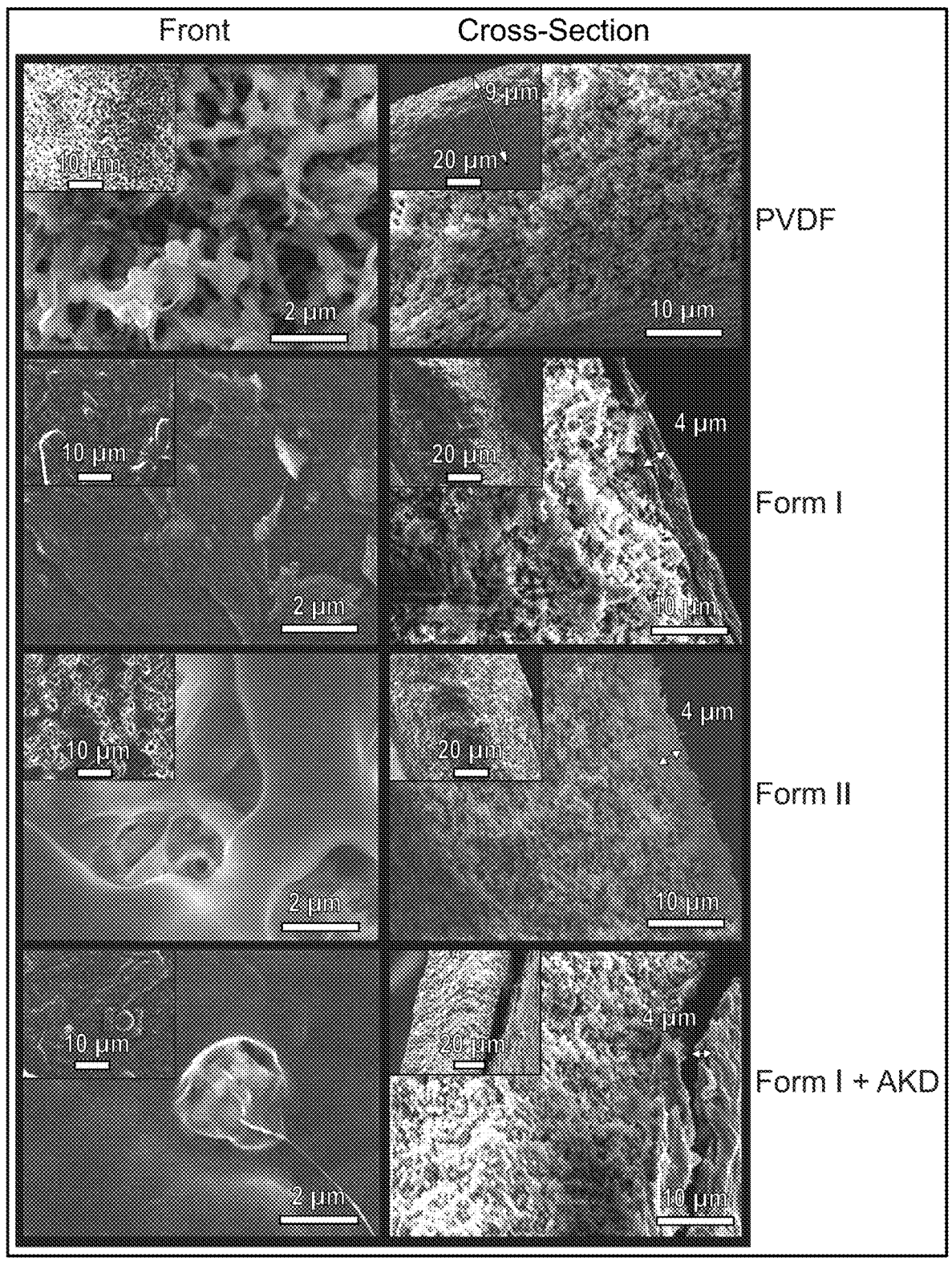
FIG. 5 are SEM Imaging of for embodiments of the present invention with frontal and cross section views as well as the thickness of each cellulose coating.
Figure 6:
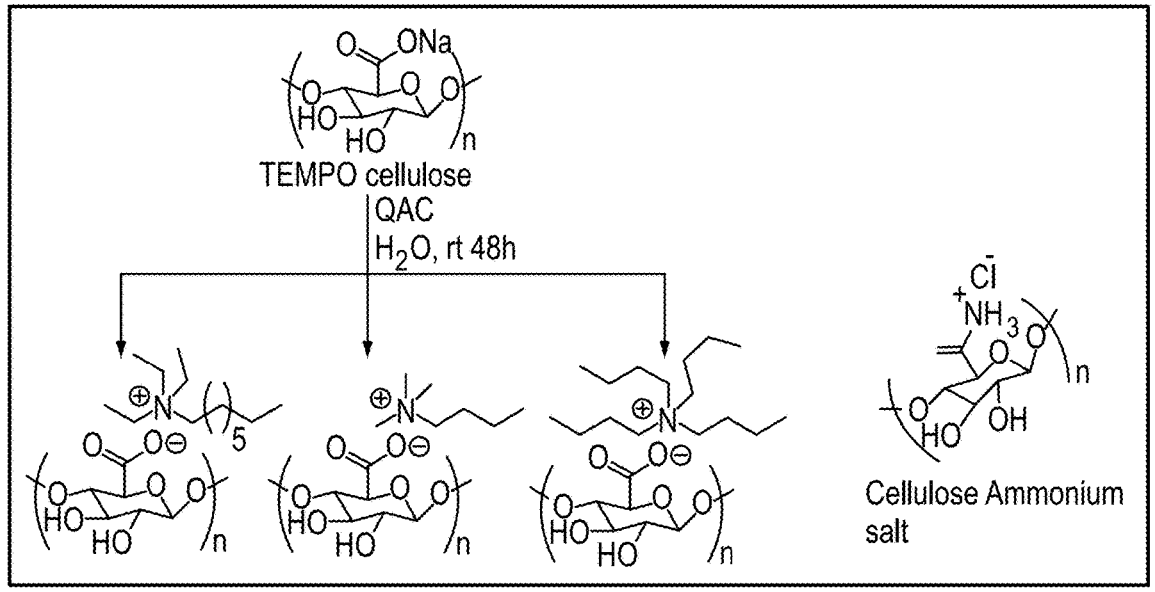
FIG. 6 illustrates synthesized various quaternary ammonium celluloses for an embodiment of the present invention.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a representative basis for teaching one skilled in the art to variously employ the present invention in virtually any appropriately detailed method, structure, or system. Further, the terms and phrases used herein are not intended to be limiting but rather to provide an understandable description of the invention.

In one preferred embodiment, the present invention provides thin-film composites that may be formed by a layer-by-layer deposition (i.e., dipping) of polymer materials. Dip and spray deliver the application benefits of the two vastly different OTO-CNMs to be exploited. Dip and spray coating may be used in the development of a thin film to take advantage of shear stress on particles within a solution to create a uniform layer on a substrate.

Various concentrations of OTO-CNM Form I, OTO-CNM Form II, and AKD wax is used in the preparation of a four percent by weight aqueous cellulose solution. A spray jet is used to apply the cellulose nanomaterial and AKD wax to the substrate. Depending on the solutions, the jet is run in a range of 15 to 30 psi. Both sides of the substrate are coated to prevent excess wrinkles. Samples are placed first in a Petri dish, and the Petri dishes is then placed in a nitrogen-filled dry box for several hours until dry. The coated samples are put into a Millipore dead-end membrane apparatus. A gas flow pressure meter is used to measure the transmembrane pressure (TMP) and SLPM passing through the sample. The system is run at several TMPs, and their respective standard liter per minute or SLPMs are collected. TMPs and SLPMs are then used to calculate the gas transfer rate normalized to ASTM E 2178-03 standards.

The units for comparison are standardized based on temperature, pressure, and molecular weight of the gas used for the analysis. This unit is known as the standard liter per minute or SLPM. Furthermore, it is essential to be able to normalize air permeance to recognized values. Therefore, the ASTM E 2178 standards for gas permeability were chosen. The ASTM standard is the permeance (L/s/m2) at 75 pascals. SLPM is then converted to units of permeance (L/s/m2) at 75 pascals, as dictated by ASTM E 2178. The values are calculated from several data points at different pressure for each membrane. Triplicate samples were run using nitrogen as the test gas. The averages of those their membranes where 7.62×10-4 (L/s/m2) at 75 pascals for the dipping method and 4.96×10-5 (L/s/m2) at 75 pascals for the spraying method. The spray technique provides a significant improvement over the dipping method, with a 175% percent difference in the gas barrier.

Other samples were produced using the spraying application method. It was observed that OTO-CNM Form I coatings had similar impermeability among the three types of most common gasses found in the atmosphere as well as a mixture thereof. The gasses utilized were nitrogen, carbon dioxide, oxygen, and a mixture thereof in the form of compressed air. The air run simulated the gas component at specific concentrations similar to the Earth's atmosphere. The most significant difference was between the gas transport of any of the coatings produced was nitrogen and oxygen at a 14% difference for the Form I coatings.

FIGS. 1-4 show how various embodiments serve as membranes or barriers. While little to no separation between gases was observed, it was more important to be able to adjust the amount of gas that could permeate through the membrane. While Form I coatings exhibited the ability to act as a gas barrier, Form II coatings were shown to be feeble gas barriers. Form II can be used as a pore-forming agent to control the porosity of the Form I coat, showing that tunability among the gas barrier properties is possible and has been achieved.

Scanning electron microscope (SEM) imaging was used to characterize the surface and cross-sectional morphology of the coating produced. All coatings were found to be 4 microns in thickness. The thickness of the polyvinyl difluoride (PVDF) porous support substrate was approximately 90 microns before coating. Clear, defined layer distinction between the coating and the substrate was observed. This was evident by the minor delamination that occurred after liquid nitrogen freeze cracking the samples prior to cross-sectional image analysis. Delamination is observable in Form I+AKD wax composite coating cross-section SEM image.

Figure 7A:
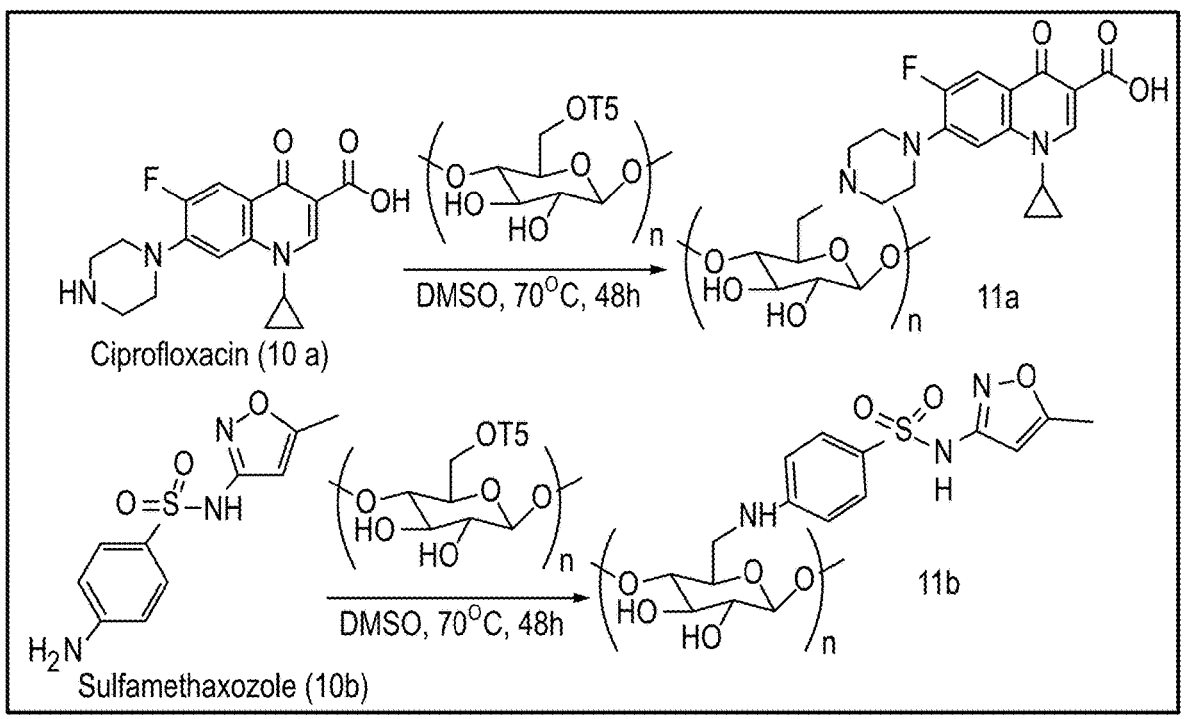
FIG. 7A illustrates cellulose-bound antimicrobial agents, using tosyl cellulose as an intermediate for an embodiment of the present invention.
Figure 7B:
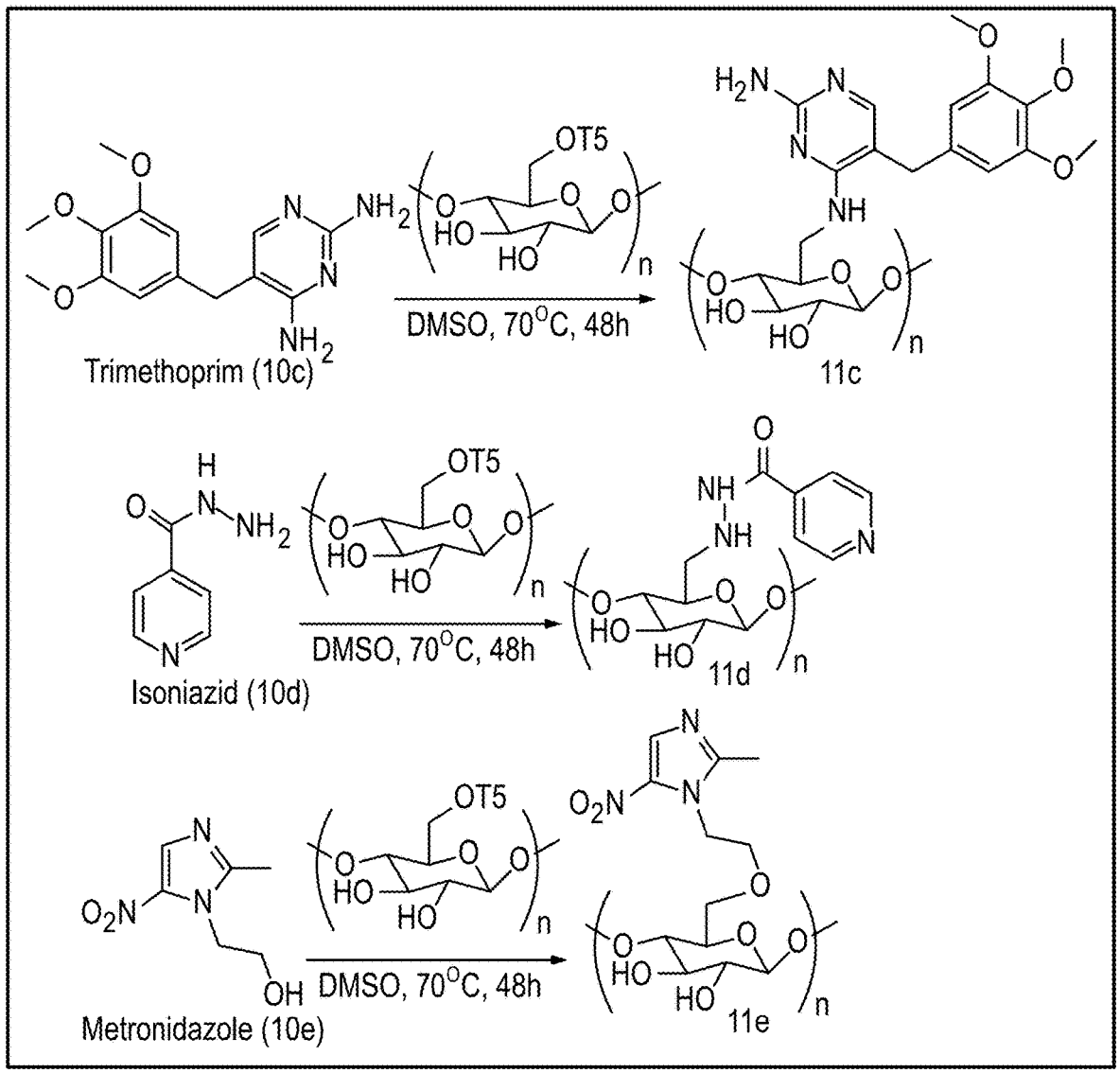
FIG. 7B illustrates cellulose-bound antimicrobial agents, using tosyl cellulose as an intermediate for an embodiment of the present invention.
Figure 8:
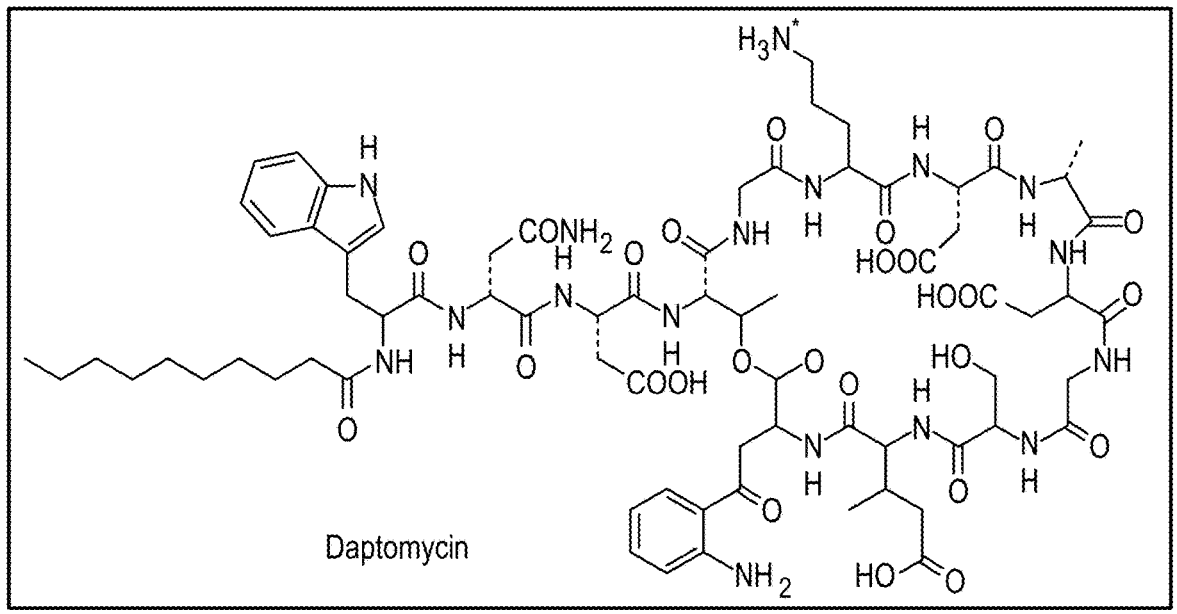
FIG. 8 illustrates antimicrobial agent using Daptomycin for an embodiment of the present invention.
Figure 9:
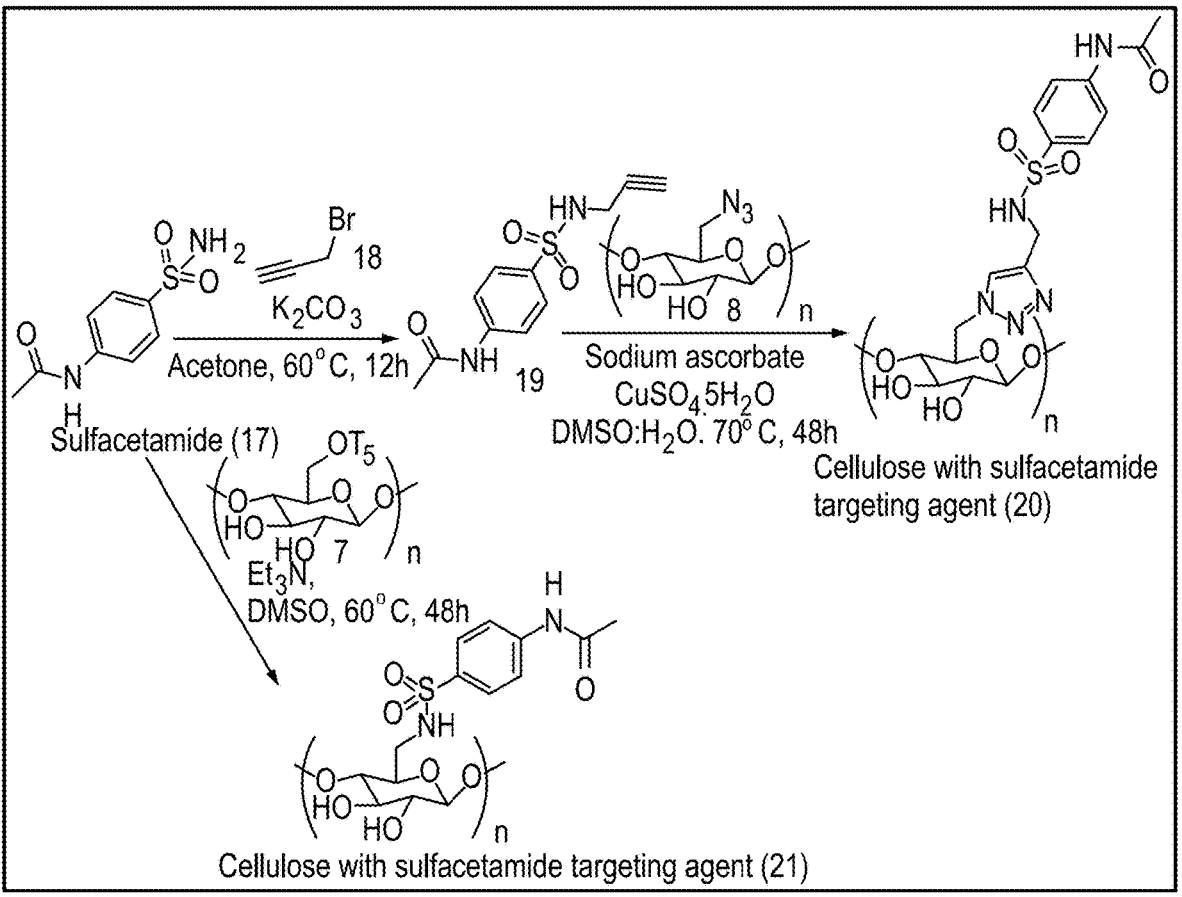
FIG. 9 illustrates click chemistry reaction route for embodiments of the present invention.
Figure 10:
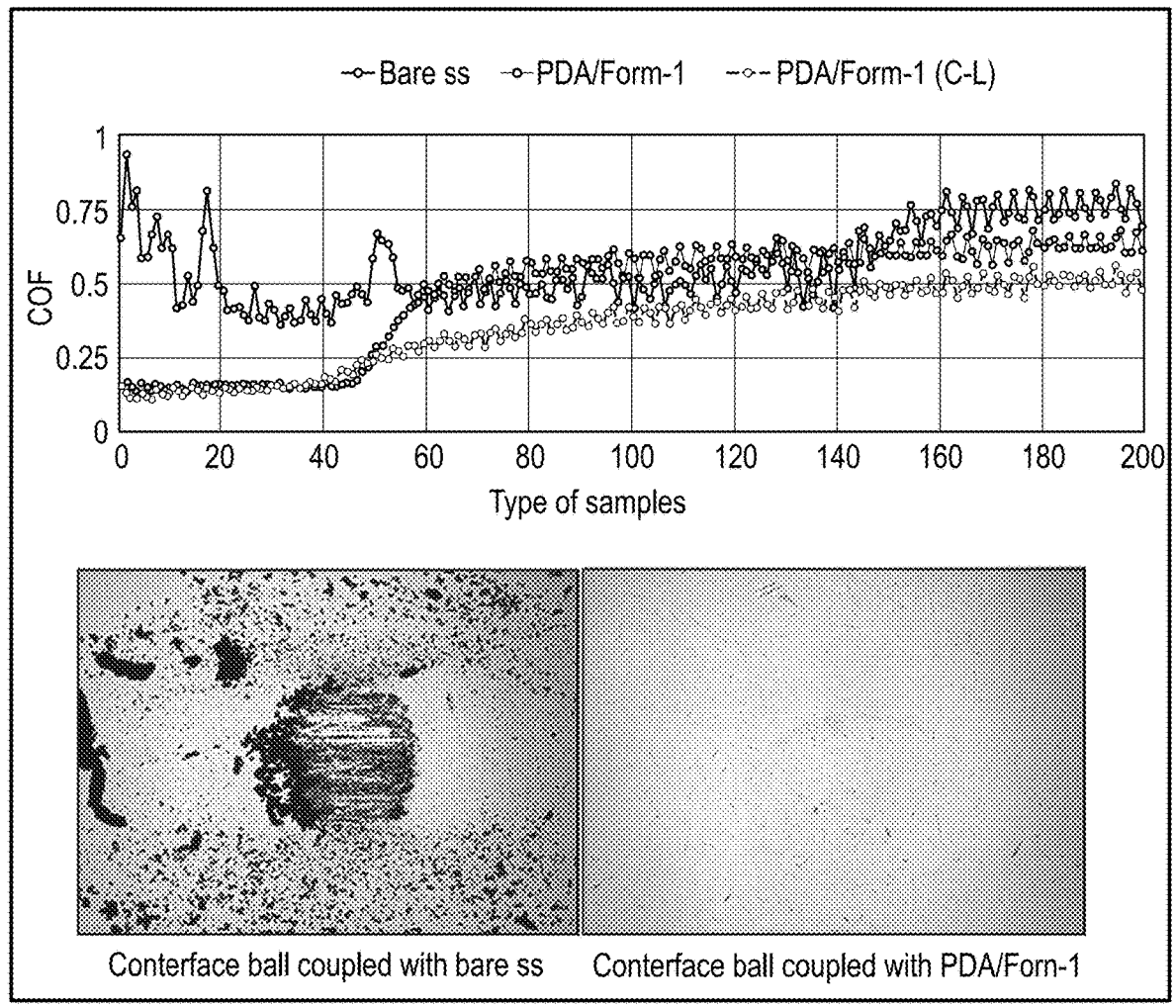
FIG. 10 shows tribological information pertaining to the number of rubs the material can have before breaking or rubbing off (SS is stainless steel) for an embodiment of the present invention.
Figure 11:
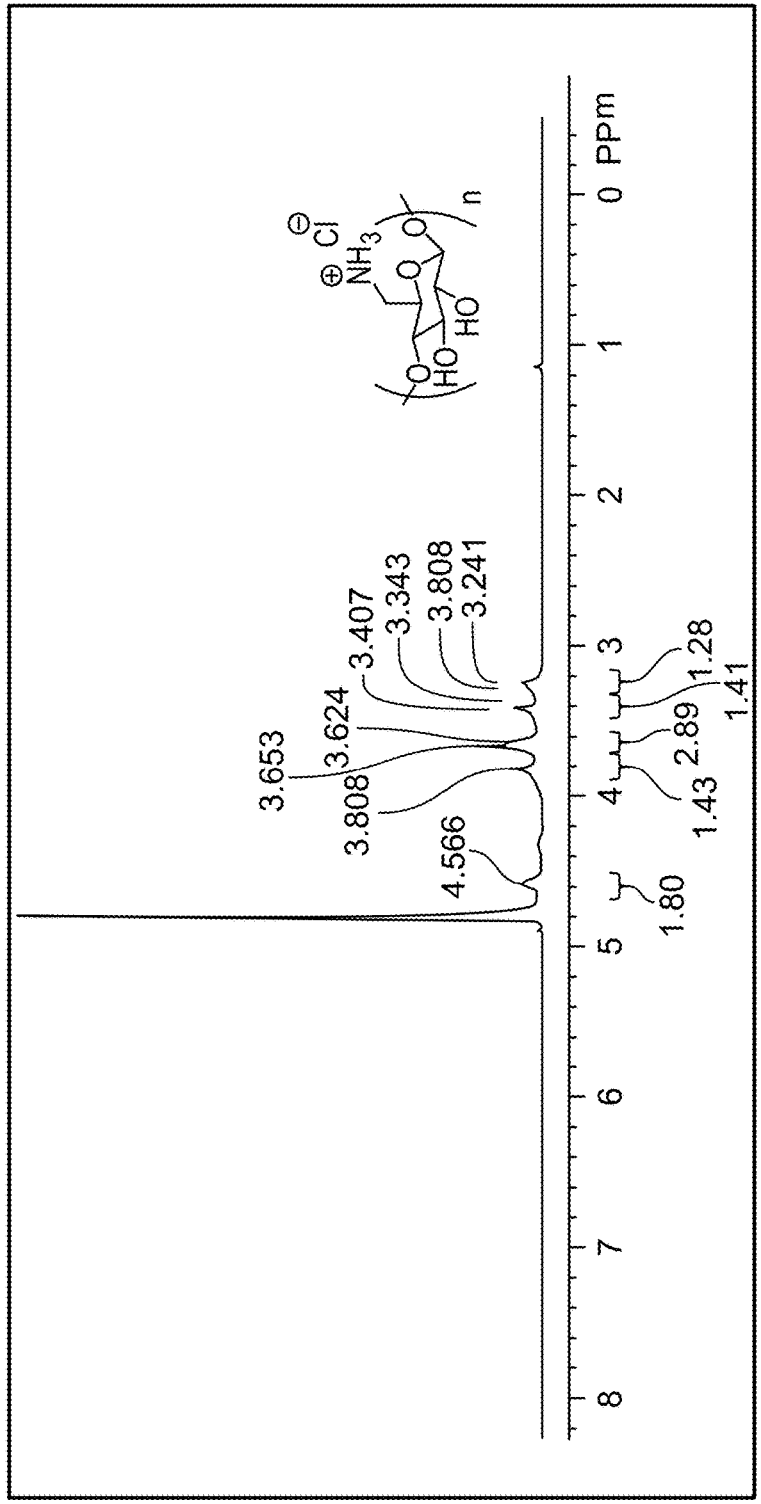
FIG. 11 illustrates HNMR of cellulose ammonium salt in D2O for an embodiment of the present invention.
Figure 12:
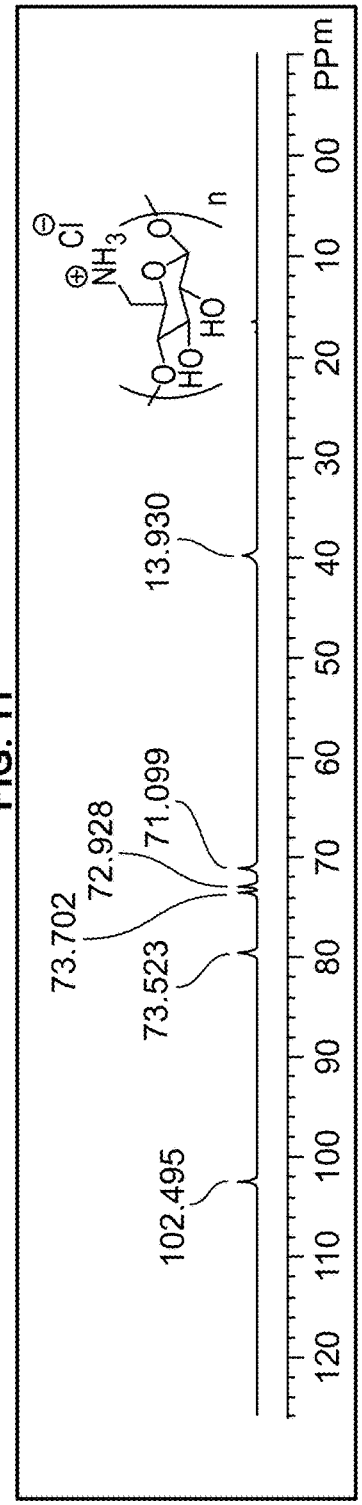
FIG. 12 illustrates C-NMR of cellulose ammonium salt in D2O for an embodiment of the present invention.
Figure 13:
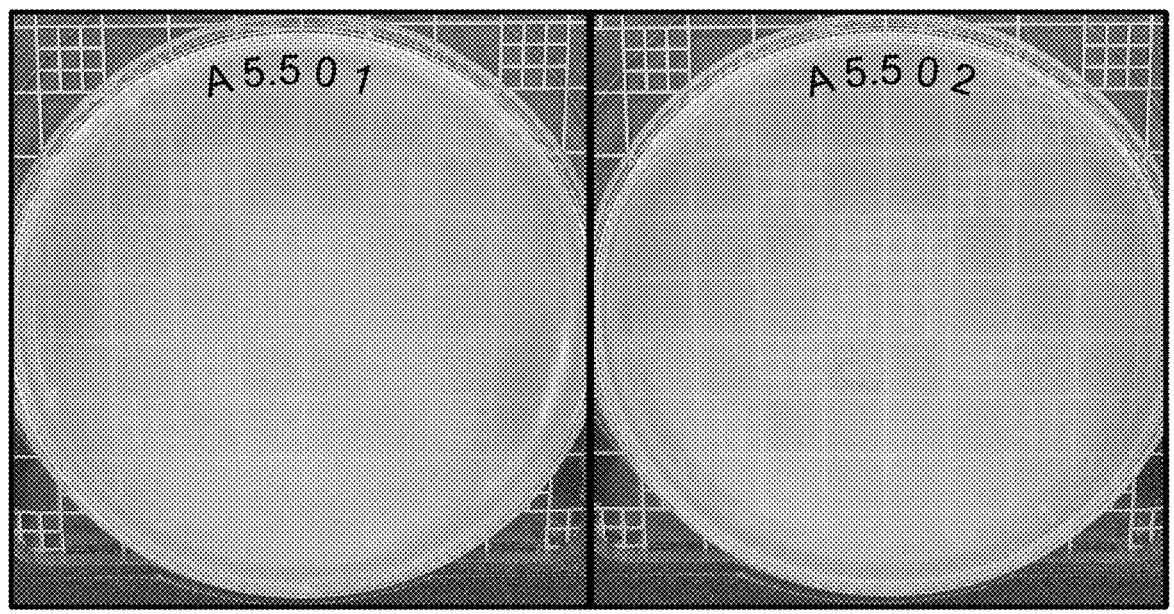
FIG. 13 illustrates dilution plates from Phi6 exposed to F1+HTA coating on a stainless steel carrier for 2 hours. Coating was allowed to rest for 24 Hours at STP before exposure.
Figure 14:
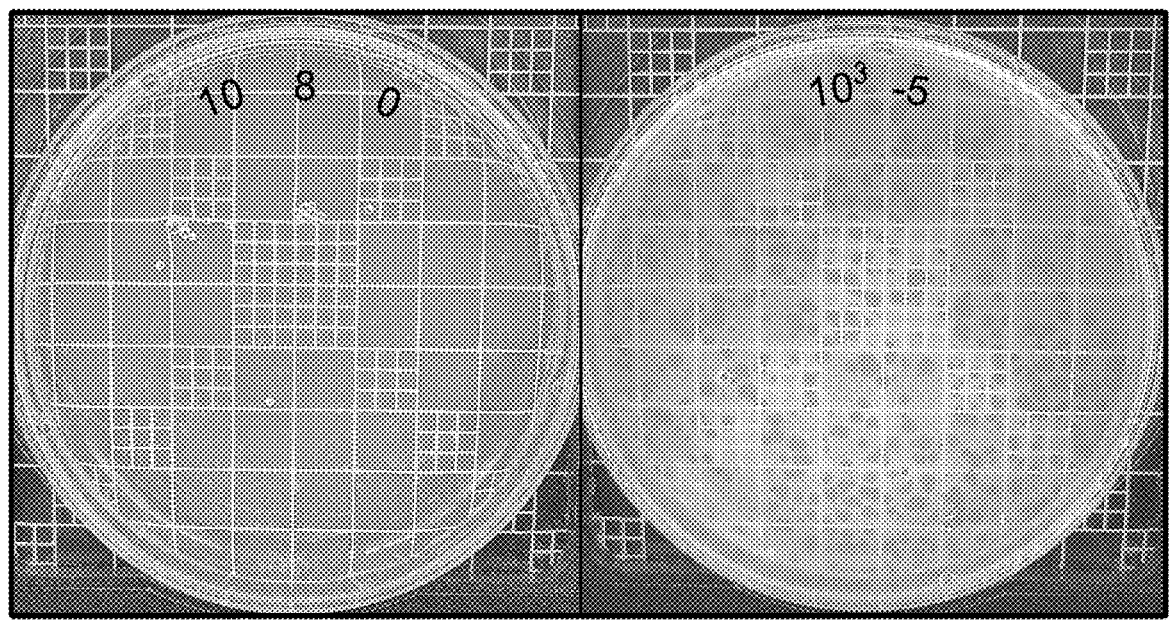
FIG. 14 illustrates controls: (Left) Direct plating of Phi 6 stock. (Right) Fifth dilution of Phi 6 stock. This shows presence of Phi 6 virus. Sixth serial dilution resulted in 70 CFU, equating to $7*10^8$ CFU/ml for stock.
Figure 17:
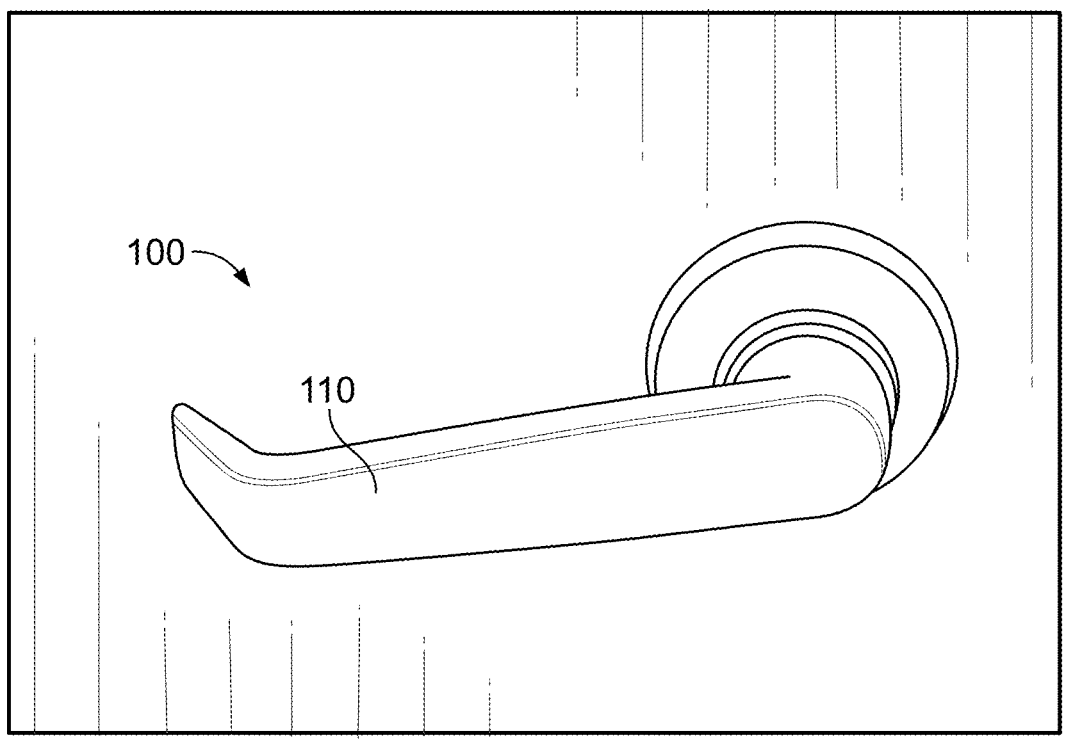
FIG. 17 shows an embodiment of the present invention applied to a substrate such as a door handle for an embodiment of the present invention.

As shown in FIG. 17, anti-bacterial/viral coating 110 may be applied to a substrate 100 which may be a door pull such as a handle or knob. For these embodiments, small anti-bacterial/viral molecules may be attached to cellulose products as shown in FIGS. 7-9. The coating may be obtained by incorporating anti-microbial species either through covalent bonding to or via non-covalent interaction with the surface of cellulose polymers. For these cellulose-bound anti-microbial agents, tosyl cellulose may be used as an intermediate.

Utilizing the above chemical synthesis approach, various anti-bacterial small molecules may be introduced onto cellulose surfaces. As an alternative strategy, the synthesis of novel derivatives of pharmacologically active molecules that terminate in an acetylenic moiety will afford the complementary click synthon for reaction with C-6 azido cellulose to form a covalent triazole-conjugated adduct of the drug molecule with the cellulose surface.

Figure 15:
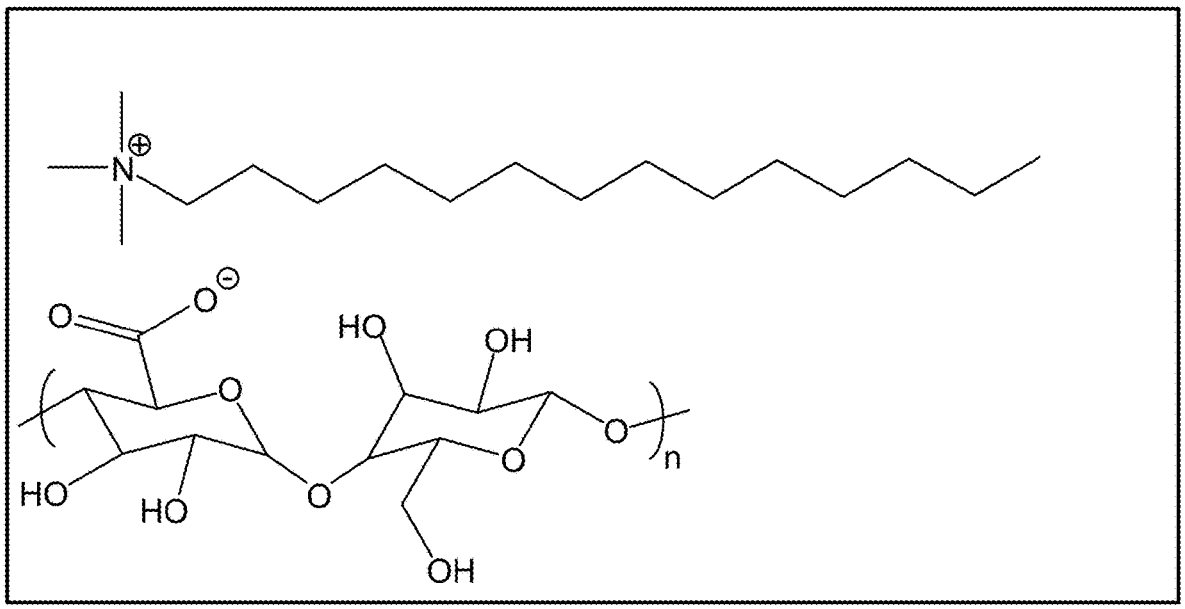
FIG. 15 shows Form 1+Myristyltrimethylammonium (C14 chain length).
Figure 16:
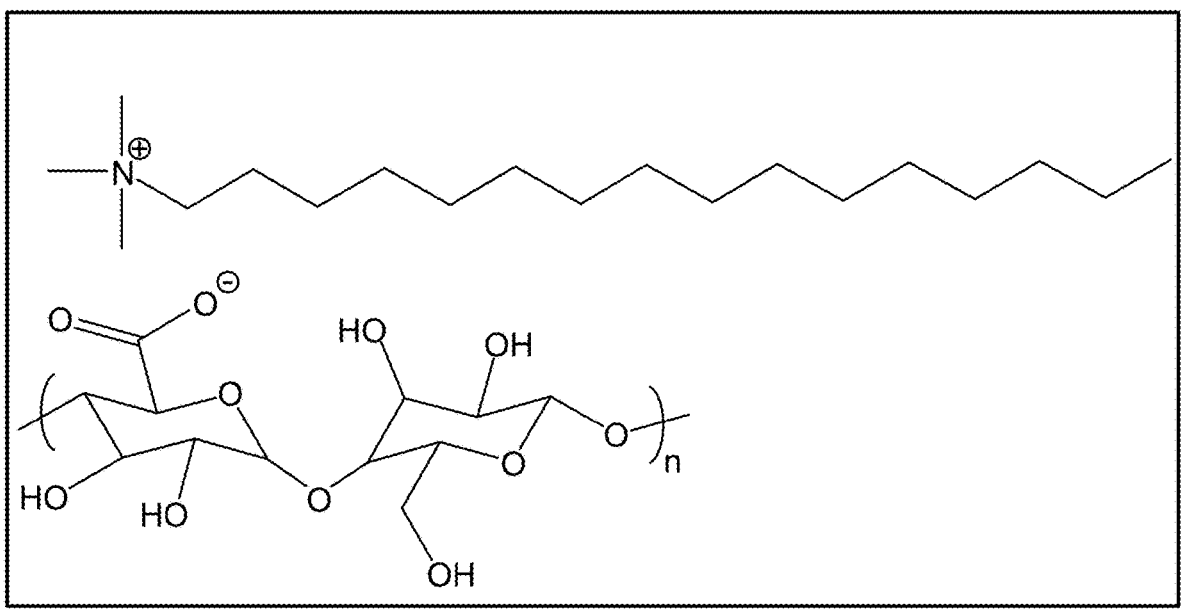
FIG. 16 Form 1+Hexadecyl trimethyl ammonium (C16 chain length).

Polyvinyl difluoride, PVDF, may be used as the support structure because it has a spongy, porous structure. SEM shows the total covering of the PVDF surface using the substrate of choice, i.e., Form I (as shown in FIG. 15), Form II (as shown in FIG. 16), and AKD wax composite. Furthermore, when AKD wax is applied in conjunction with Form I, binding of the wax to the cellulose substrate occurs. It was observed that Form I has better gas barrier properties and that this could be attributed to the dense matrix that develops as seen by SEM. Form II, on the other hand, forms spotty, porous structures that do not create gas barriers on the surface but provide other beneficial properties such as hydrophilicity or pore formation for gas tunability. Form I+AKD show the binding of the wax to the CNM substrate while maintaining the dense film needed for a gas barrier material.

A click chemistry reaction route can be utilized in the synthesis of Form 1 covalently bonded antifungals, antibacterial agents, anti-viral, and anti-MRSA/antiseptic agents.

Most agents fall into three categories: Benzalkonium chlorides (quaternary ammonium compounds), Hydrogen peroxide-based compounds (peroxyacetic acid usually). Chlorine-containing (i.e., hypochlorite, hypochlorous acid) reagents. The cellulose ammonium salt could be characterized by solution-state 1-H and C-13 NMR in $D_2O$ due to its water-solubility.

Even though a solution that improves OTO-CMNs hydrophobic nature was made, the moisture barrier properties may be further enhanced by increasing the concentration of AKD wax and other secondary materials that have been known to increase hydrophobicity. Furthermore, covalent and ionic modifications of the cellulose may provide various alternative uses of the surface-modified cellulose besides just for the packaging.

Since it is known that COVID-19 can survive a significant amount of time on surfaces, a surface coating that works on doorknobs, flooring materials, countertops, etc. is needed to make the public feel safe when touching or walking on these surfaces without risk of being infected. The above-described embodiments of the present invention have the ability to be spray coated while maintaining continuous integrity, anti-viral functionality, and surface adhesion to afford significant protection above and beyond just an anti-bacterial wipe-down of the surface (i.e., up to 50 touches from a metal surface coating has been demonstrated before anti-viral efficacy becomes compromised).

In other embodiments, a colored dye (less than 5% concentration) may be included in the composite spray material so that when sprayed on a surface such as a doorknob, someone would know that it is safe to touch as long as the knob remains colored with the dye. Furthermore, when the surface starts returning to its original color, the exterior can be resprayed, and anti-viral activity restored.

In other embodiments, a surfactant, i.e., tween-19 at 0.0155 concentration, may be included in the composite spray material so that when sprayed on a surface such as a doorknob coating consistency and spreading could be maximized. Furthermore, the coating can be applied without a surfactant and still be valid.

In other embodiments, the simple addition of a binding agent may be included in the form of a cross-linking agent such as an ionic liquid in the composition of less than one percent in the composite spray material so that when sprayed on a surface such as a doorknob, it would be water-stable as long as the knob coating wasn't physically removed.

In other embodiments, a binding agent may be the solvent in the form of a cross-linking agent such as an ionic liquid in the composition of 90% binding agent 10% cellulose by mass. The dissolved cellulose solutions can then be regenerated in a water bath to produce non-toxic freestanding cellulose films.

In other embodiments, non-toxic freestanding cellulose films can be prepared between 100-2000 microns for hemofiltration applications.

In other embodiments, non-toxic freestanding cellulose films can be prepared at 200 microns for hemofiltration showed nominal loss of performance over long term fouling studies with blood and bovine serum albumin.

In other embodiments, non-toxic freestanding cellulose films can be prepared between 100-2000 microns for ion separation applications, including deionization, electro deionization, reverse electro deionizaton.

In other embodiments, non-toxic freestanding cellulose films can be prepared at 750 microns for ion separation applications where potassium selectivity is essential. These membranes have shown potassium ion selectivities of greater than 99%.

For other embodiments of the present invention, two quanternary ammonium based coatings were tested for anti-viral efficacy against *Pseudomonas* virus phi6. Testing followed EPA Protocol for the Evaluation of Bactericidal Activity of Hard, Non-porous Copper Containing Surface Products. Coating A was made from Form 1 Tempo-Oxidized cellulose (Form 1) and Hexadecyltrimethyl Ammonium (HTA). Coating B was made from Form 1 and Myristyltirmethyl Ammonium (MTA). Coatings were of 5000 relative ppm. Each coating was tested on stainless steel and brass carrier substrates.

As shown below in Table 1, the coatings were tested at 2 hrs, 24 hrs, and 5 days after application to carriers. A Phi 6 concentration of $7*10^8$ PFU/ml was applied to 0 hr and 24 hr carriers, a concentration of $7*10^6$ PFU/ml was applied to 5 day carriers. Each carrier was washed and diluted by 1-log following protocol and therefor the highest log reduction reportable is one below applied stock.

The most consistent results were found at 24 hours where all carriers showed a 7-log reduction. At 0 hrs and 5 days there were max reductions reported however they are not seen across all samples/substrates. These results show a high antiviral efficacy up to potentially 5 days.

TABLE 1

| Coating | Substrate | Log Reduction | St. DEV |
|---|---|---|---|
| 0 hrs | | | |
| HTA | Brass | 7.00E+07 | 0.00E+00 |
| HTA | Stainless | 3.68E+06 | 3.86E+01 |
| MTA | Brass | 1.20E+03 | 1.20E+05 |
| MTA | Stainless | 1.00E+07 | 1.40E+01 |
| 24 hrs | | | |
| HTA | Brass | 7.00E+07 | 3.00E+00 |
| HTA | Stainless | 7.00E+07 | 3.00E+00 |
| MTA | Brass | 7.00E+07 | 0.00E+00 |
| MTA | Stainless | 7.00E+07 | 0.00E+00 |
| 5 days | | | |
| HTA | Brass | 1.78E+02 | 5.73E+03 |
| HTA | Stainless | N/A | N/A |
| MTA | Brass | 8.22E+01 | 1.61E+04 |
| MTA | Stainless | 7.00E+05 | 0.00E+00 |

While the preceding written description enables one of ordinary skill to make and use what is considered presently to be the best mode thereof, those of ordinary skill will understand and appreciate the existence of variations, combinations, and equivalents of the specific embodiment, method, and examples herein. The disclosure should, therefore, not be limited by the above-described embodiments, techniques, and examples, but by all embodiments and processes within the scope and spirit of the disclosure.

What is claimed is:

1. A cellulose based anti-viral/anti-microbial coating comprising:
   a cellulose nanomaterial layer; and
   a tosyl cellulose intermediate layer; and
   an anti-viral/anti-microbial layer bonded to said intermediate layer.

2. The cellulose based anti-microbial coating of claim 1 wherein said anti-viral/anti-microbial layer is covalently bonded to said intermediate layer.

3. The cellulose based anti-microbial coating of claim 1 wherein said anti-viral/anti-microbial layer is non-covalently bonded to said intermediate layer.

4. The cellulose based anti-microbial coating of claim 1 wherein said anti-viral/anti-microbial layer is Ciprofloxacin.

5. The cellulose based anti-microbial coating of claim 1 wherein said anti-viral/anti-microbial layer is Sulfamethoxazole.

6. The cellulose based anti-microbial coating of claim 1 wherein said anti-viral/anti-microbial layer is Trimethoprim.

7. The cellulose based anti-microbial coating of claim 1 wherein said anti-viral/anti-microbial layer is Isonaizid.

8. The cellulose based anti-microbial coating of claim 1 wherein said anti-viral/anti-microbial layer is Metronidazole.

9. The cellulose based anti-microbial coating of claim 1 wherein said anti-viral/anti-microbial layer is Daptomycin.

10. The cellulose based anti-microbial coating of claim 1 wherein said anti-viral/anti-microbial layer is a combination of Ciprofloxacin, Sulfamethoxazole, Trimethoprim, Isonaizid, Metronidazole and Daptomycin.

11. The cellulose based anti-microbial coating of claim 1 wherein said anti-viral/anti-microbial layer is a benzalkonium chloride.

12. The cellulose based anti-microbial coating of claim 1 wherein said anti-viral/anti-microbial layer is a hydrogen peroxide-based compound.

13. The cellulose based anti-microbial coating of claim 1 wherein said anti-viral/anti-microbial layer is peroxyacetic acid.

14. The cellulose based anti-microbial coating of claim 1 wherein said anti-viral/anti-microbial layer contains chlorine.

15. The cellulose based anti-microbial coating of claim 1 wherein said anti-viral/anti-microbial layer is hypochlorite acid.

16. The cellulose based anti-microbial coating of claim 1 wherein said anti-viral/anti-microbial layer is acid.

17. A method of creating an anti-viral/anti-microbial coating on a substrate comprising the steps of:
providing a cellulose nanomaterial layer;
adding an intermediate layer to said cellulose nanomaterial layer, said intermediate layer is tosyl cellulose;
creating an anti-viral/anti-microbial layer on said intermediate layer to create an anti-viral/anti-microbial coating; and
applying said anti-viral/anti-microbial coating to a substrate.

18. The method of claim 17 wherein said anti-viral/anti-microbial layer is covalently bonded to said intermediate layer.

19. The method of claim 17 wherein said anti-viral/anti-microbial layer is non-covalently bonded to said intermediate layer.

20. The method of claim 17 wherein said anti-viral/anti-microbial layer is Ciprofloxacin.

21. The method of claim 17 wherein said anti-viral/anti-microbial layer is Sulfamethoxazole.

22. The method of claim 17 wherein said anti-viral/anti-microbial layer is Trimethoprim.

23. The method of claim 17 wherein said anti-viral/anti-microbial layer is Isonaizid.

24. The method of claim 17 wherein said anti-viral/anti-microbial layer is Metronidazole.

25. The method of claim 17 wherein said anti-viral/anti-microbial layer is Daptomycin.

26. The method of claim 17 wherein said anti-viral/anti-microbial layer is a combination of Ciprofloxacin, Sulfamethoxazole, Trimethoprim, Isonaizid, Metronidazole and Daptomycin.

\* \* \* \* \*